INVENTOR.
JOHN J. PEARL
BY
Robert W. Beach
ATTORNEY

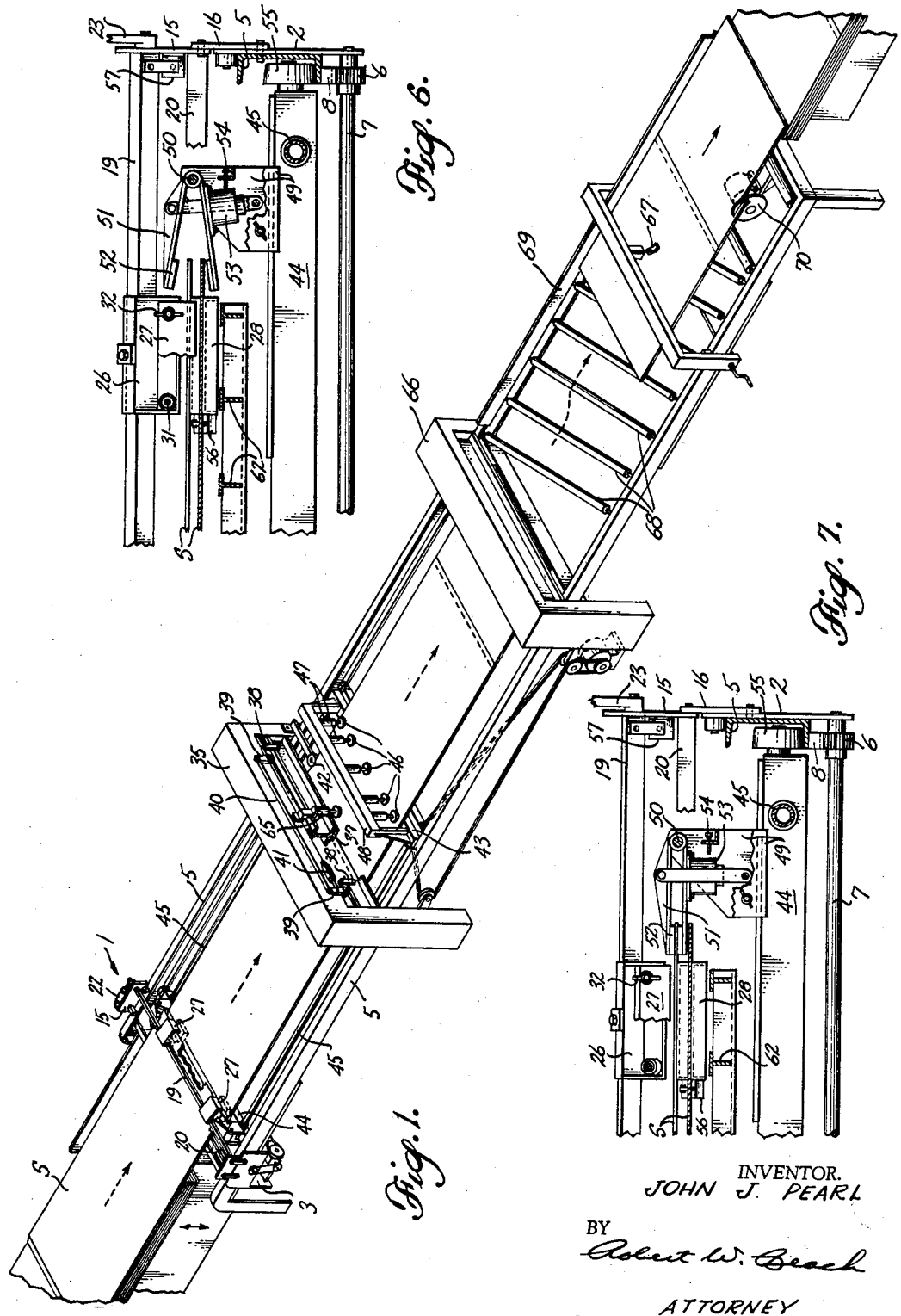

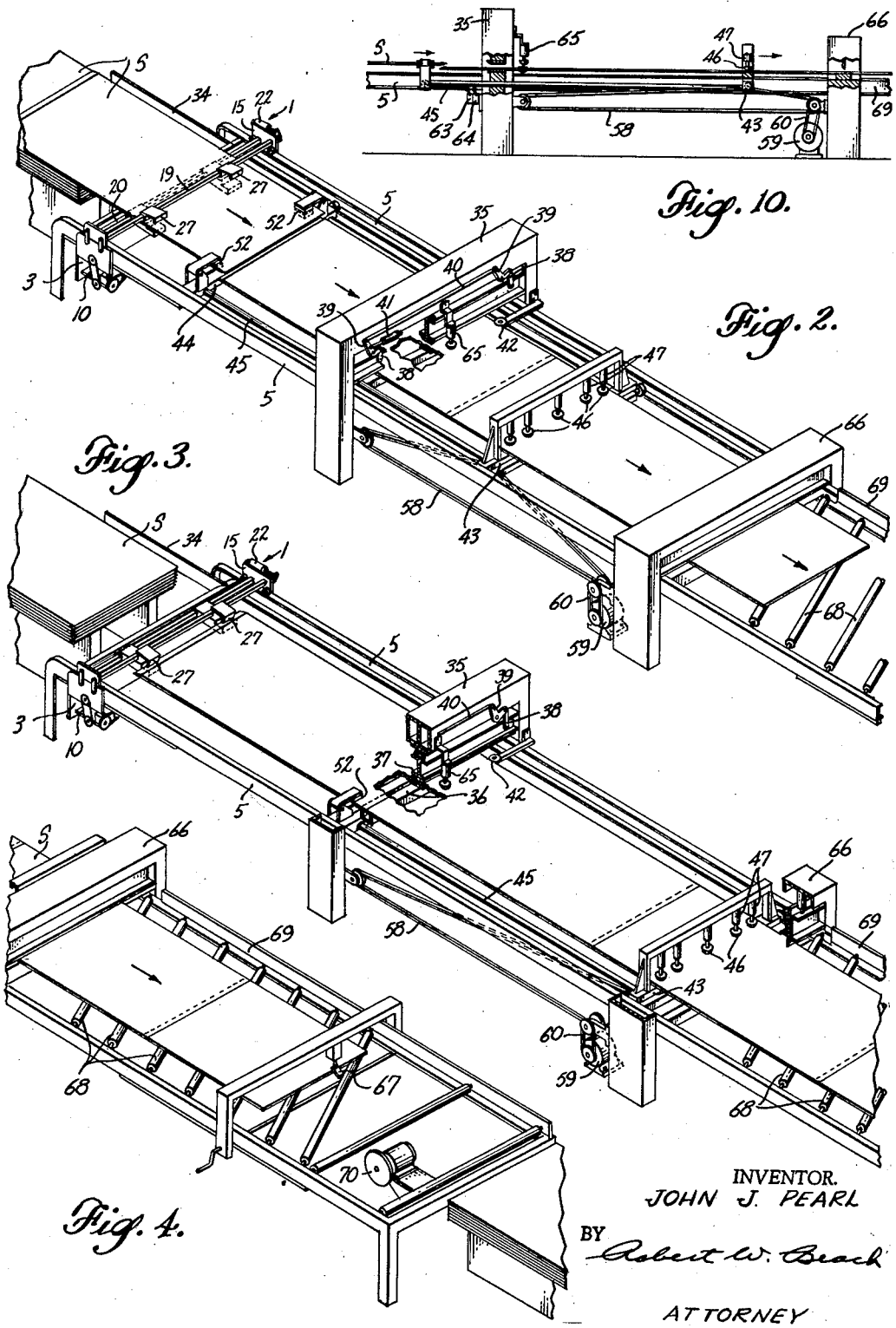

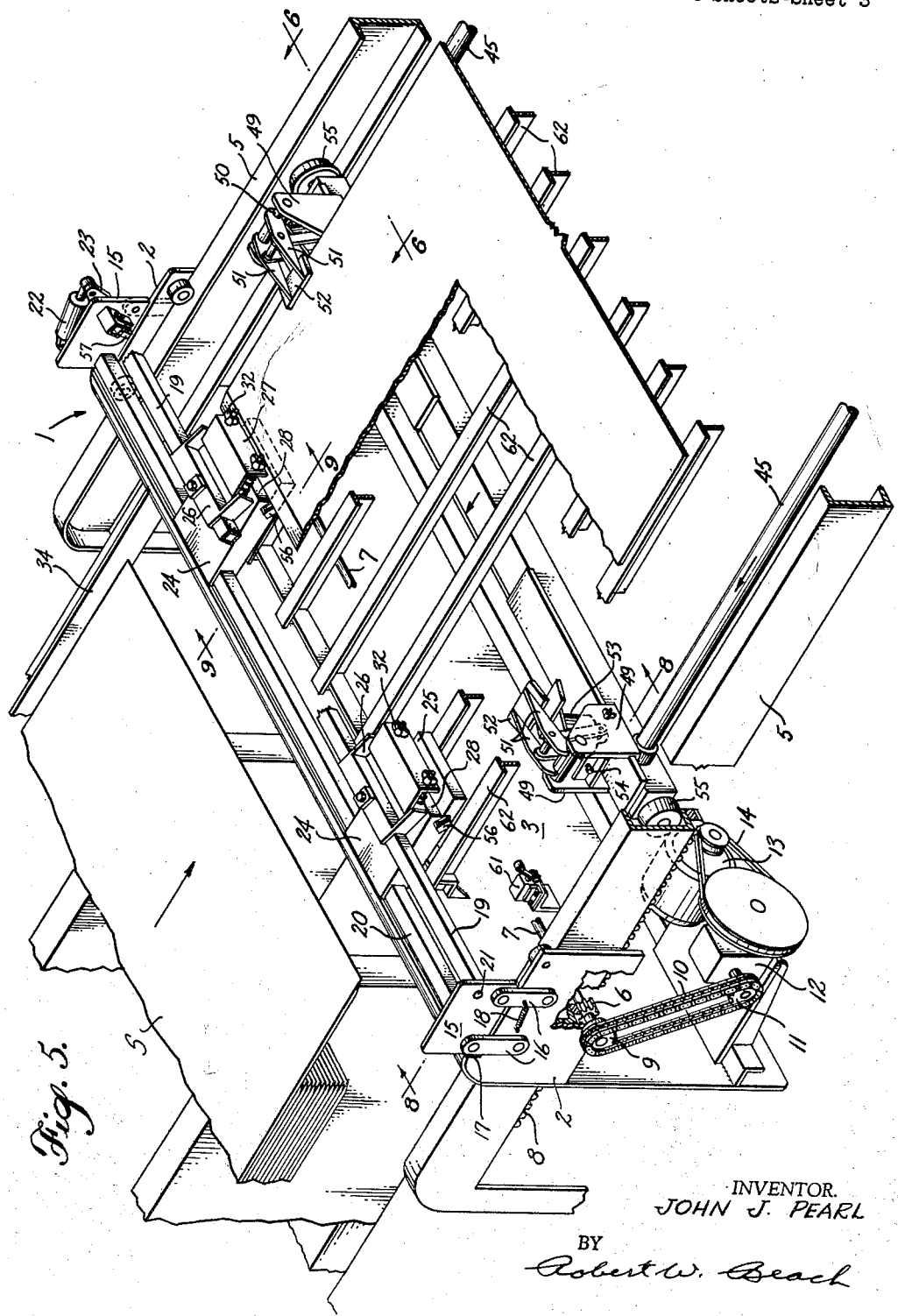

United States Patent Office 3,131,737
Patented May 5, 1964

3,131,737
SCARFED VENEER END JOINING APPARATUS
John J. Pearl, Lebanon, Oreg., assignor, by mesne assignments, to United States Plywood Corporation, New York, N.Y., a corporation of New York
Filed Aug. 17, 1960, Ser. No. 50,119
13 Claims. (Cl. 144—281)

The apparatus of the present invention is used for joining sheet edges and particularly the overlapping edges of adjacent sheets which are scarfed. Such apparatus is particularly useful for joining the scarfed ends of wood veneer sheets in overlapping relationship.

It is an object to provide apparatus for joining the ends of veneer sheets which will operate to produce an endless line of joined veneer which can be cut into desired lengths different from the initial lengths of the veneer sheets. In the operation of such an apparatus it is a particular object to enable the leading end of a succeeding sheet to be located in a desired relationship to the trailing end of a preceding sheet quickly and accurately even though such relationship involves overlapping such sheet ends.

Following the establishment of the desired registry of the trailing end of a preceding sheet and the leading end of a succeeding sheet, it is an object to transport such two sheets simultaneously with their ends in such registry into a joining press where such sheet ends will be joined by pressure exerted by the press with or without accompanying heat, depending upon the type of adhesive used for making the joint.

Another object is to provide apparatus for joining together the ends of adjacent sheets which can be adjusted readily to accommodate sheets of different lengths.

A further object is to provide such sheet end joining apparatus which will join two adjacent sheets with reference edges in alignment even though the ends to be joined are not precisely perpendicular to such reference edges.

It is also an object to provide safety control mechanism for such joining apparatus which will prevent inadvertent operation of the apparatus to feed sheets lengthwise if the sheet end registering mechanism is not in proper condition to effect registry of sheet ends to be joined.

In general, the joining apparatus includes registering mechanism by which the trailing end of a preceding sheet and the leading end of a succeeding sheet may be located in proper overlapping relationship to be joined. Both the preceding sheet and the succeeding sheet are then moved simultaneously along the same path and at the same speed until such registered ends are moved into position in a press and the press is closed. Such movement may be effected by clamping mechanism which will be released after the press is closed and will return to a starting position for clamping the next set of sheets having ends in proper overlapping relationship to be joined. When the joint in the press has been set, the press will be released and the sheet transport mechanism will be shifted again to move the overlapping ends for the next joint into the press while simultaneously moving out of the press the completed joint. The location of the sheet end registering mechanism relative to the press may be altered to correspond to the lengths of sheets being joined.

FIGURE 1 is a top perspective view of scarfed veneer end joining apparatus showing the position of its parts during a joint pressing operation. FIGURE 2 is a similar view showing parts of the apparatus acting to transport sheets the ends of which are to be joined. FIGURE 3 is a similar view showing the parts in positions assumed at the end of a sheet-transporting operation. Parts of the apparatus have been broken away in each view.

FIGURE 4 is a top perspective view of the discharge end of the apparatus showing its parts in positions different from the positions of corresponding parts in FIGURE 1.

FIGURE 5 is a top perspective view of sheet end registering mechanism on an enlarged scale and with parts broken away.

FIGURE 6 (sheet 1) is a fragmentary sectional view through a portion of the apparatus taken on lines 6—6 of FIGURE 5 showing clamping mechanism in released condition and FIGURE 7 is a similar view showing the clamping mechanism in gripping position.

Figure 8:
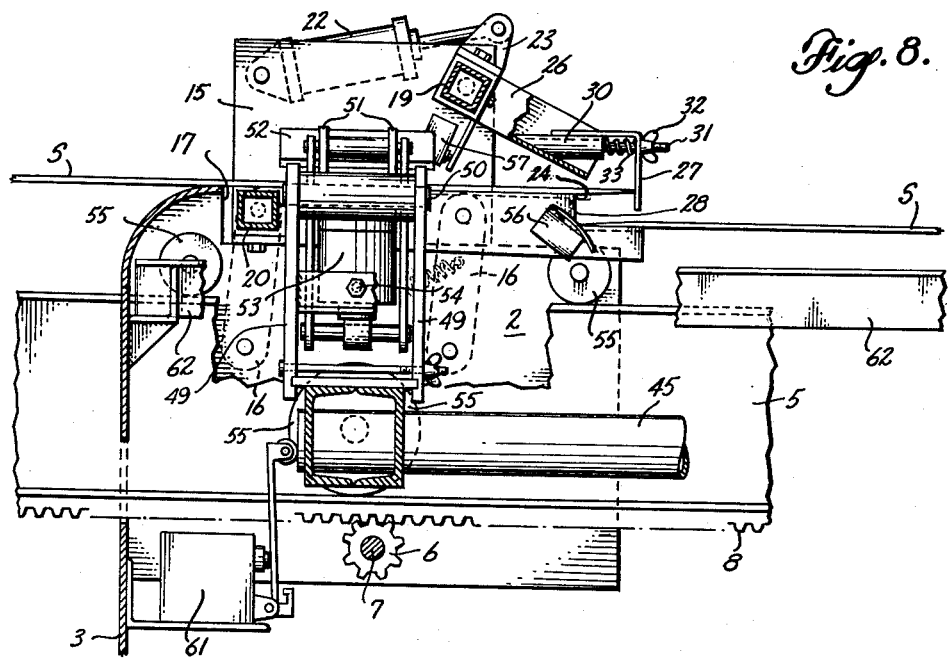
Figure 9:
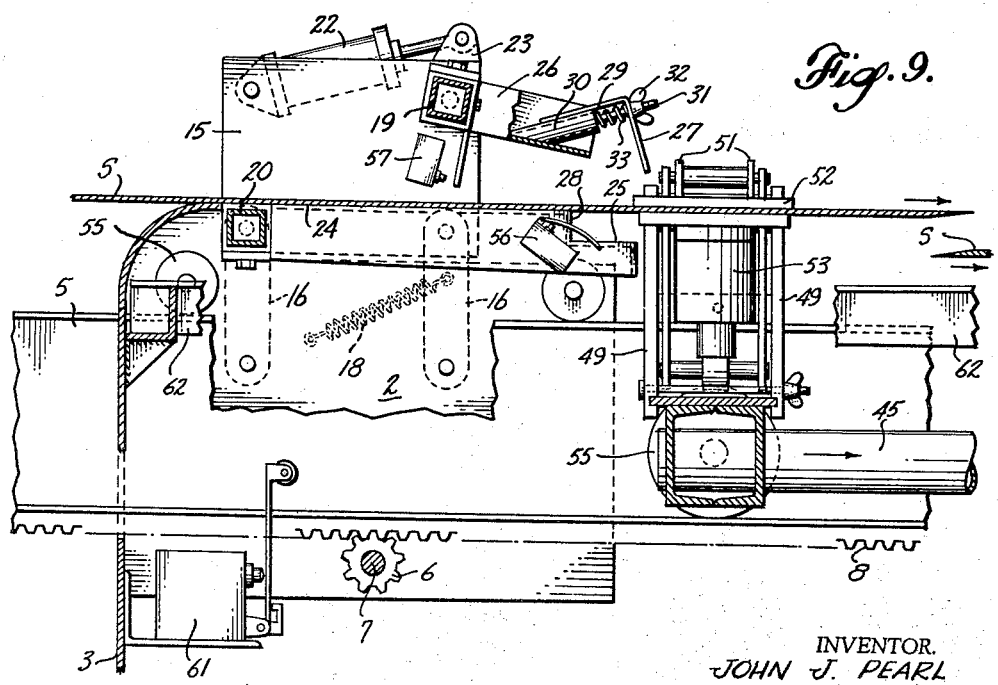

FIGURE 8 (sheet 4) is a longitudinal vertical sectional view through a portion of the apparatus taken on line 8—8 of FIGURE 5, and FIGURE 9 is a similar view taken on line 9—9 of FIGURE 5.

FIGURE 10 (sheet 2) is a fragmentary side elevation view of a portion of the apparatus with parts broken away.

Presses have been used heretofore for joining scarfed veneer ends but the joint to be secured has been placed in the joining press by hand. Also, in order to prevent the scarfs from slipping relative to each other as the press is closed, temporary fasteners of some type have been used to secure together the ends to be joined because clamps directly securing such ends together would interfere with the press platens. It is undesirable, however, for such temporary fastening devices to be allowed to remain in the joint, and time and trouble is required to remove them. The present apparatus effects joining of overlapping scarfed veneer ends which have been properly located in an automatic, quick and accurate manner without any type of temporary fastening devices being required. Consequently, the present apparatus will end join sheets more accurately, more rapidly and more efficiently than prior apparatus used for this purpose.

If the sheet end joint is to be made between scarfed ends, the sheet ends will have been scarfed by apparatus other than that of the present invention and prior to such sheets being fed to this apparatus. If the sheets are to be end-joined into a continuous length, it is preferable for one end of each sheet to have a standing bevel and the other end to have an under bevel. Such sheets S may be supplied to the present apparatus in a stack with the sheets oriented so that all standing bevels are at one end of the stack and all under bevels are at the other end of the stack. Preferably the under-beveled ends of the sheets are the leading ends in the direction of sheet movement through the apparatus and the standing bevels are on the trailing ends of the sheets.

The apparatus includes three principal components, namely, end-registering mechanism for locating the trailing end of a preceding sheet and the leading end of a succeeding sheet in proper overlapping registery to be joined; second, press mechanism for pressing together the sheet ends in such overlapping relationship for making the joint; and third, length-cutting and edge-trimming mechanism. These three mechanisms are spaced apart lengthwise of the sheet and each sheet is moved from one mechanism to the next by clamping transport means. Such movement is not continuous in the preferred type of apparatus but is interrupted periodically during the operation of placing the ends of sheets to be joined in proper overlapping relationship, the end-joining pressing operation and the operation of cutting the continuous sheet into sections of desired lengths.

As illustrated in FIGURE 1, scarf jointed veneer sheets extend end-to-end from the stack of veneer sheets S to the sheet end-registering mechanism, to the press mechanism and finally to the length-cutting mechanism. At the right of that figure sheets cut to length are shown stacked while a sheet newly cut to length is being edge-trimmed and is moving onto the stack of finished sheets.

The remainder of the continuous sheet is at rest and the press has nearly completed a joining operation while the next sheet S from the stack is being fed into the apparatus and positioned ready to be engaged by the sheet transport means.

As a sheet S is fed into the apparatus from the stack, the leading end of such a succeeding sheet must be located in proper overlapping relationship to the trailing end of the immediately preceding sheet. Such location is controlled by the end-registering mechanism generally indicated at 1 which is shown in greatest detail in FIGURES 5 to 9, inclusive. Such registering mechanism constitutes a carriage including side plates 2 interconnected by an apron 3 extending transversely of the direction of movement of the sheets. Such side plates are supported by rollers 4 on side beams 5 of the machine frame along which the registering mechanism carriage may be moved to adjust its location for accommodating sheets of various lengths. Coordinated movement of the two side plates 2 and the apron 3 is effected by gears 6 on the common shaft 7 which mesh with racks 8 along the bottoms of the frame beams 5. Such shaft is turned by a sprocket 9 driven by a chain 10 which in turn is driven by sprocket 11 of a gear box 12 powered by the motor 13 through a belt and pulley drive 14.

Above the side plates 2 are mounting plates 15 independent of each other which are supported from the side plates 2 by parallel links 16. Such links guide the mounting plates 15 for limited movement relative to the end plates parallel to the direction of movement of the sheets but normally such mounting plates are held in a rearward limiting position in abutment with stop shoulders 17 of the end plates by tension springs 18 which urge the upper ends of links 16 rearward. Two parallel bars including a forward bar 19 and a rearward bar 20 extend between and are supported by the mounting plates 15. The forward bar 19 is mounted on pivots 21 about which such bar can be rocked by a fluid pressure actuator 22 reacting between one of the end plates 15 and a crank arm 23 secured to the forward bar. Such fluid pressure actuator preferably is an air piston-and-cylinder device.

As shown best in FIGURES 5 and 9, the rearward bar 20 carries two tables 24 spaced lengthwise of it, having corresponding edges fixed to said rearward bar and projecting forwardly in cantilever fashion from it beneath the forward bar 19 as shown in FIGURE 9. The forward portions of these tables have ledges 25 projecting forward from the main portions of the tables for supporting the trailing end of a preceding sheet. At locations corresponding transversely of the path of movement of the sheets the upper and forward bar 19 carries stop members 26 projecting forward from such bar. Such stop members have contact flanges 27 projecting downward from them and which are adjustable toward and away from the shoulders 28 at the root ends of the ledges 25. By such adjustment the degree of overlap of the leading end of a succeeding sheet over the trailing end of a preceding sheet can be altered.

The contact flanges 27 may be elements of angle members having horizontal flanges 29 slidably engaging rods or tubes 30 carried by and projecting forwardly from the stop members 26. Such rods or tubes carry externally threaded projections 31 extending through holes in the flanges 27. Wing nuts 32 threaded on such projections will limit the movement of contact flanges 27 away from the shoulders 28 for each stop member 26. A compression spring 33 interengaged between the rod or tube 30 and the contact flange will hold the flange in engagement with the nut 32 on the corresponding threaded projection 31. By varying the position of the nuts 32 on the projections of each stop member, the attitude of each contact flange can be adjusted so as to be precisely parallel to the shoulder 28 and the two flanges can be disposed exactly equidistantly from their respective shoulders 28.

By actuation of the fluid pressure actuator 22 to rotate the forward bar 19 about its pivot 21, the stop members 26 can be moved between the lowered sheet end contacting position shown in FIGURE 8 and the raised position of FIGURE 9 in which a sheet passing over the rounded upper edge of the apron 3 and resting on tables 24 can pass under the contact flanges 27 as movement of the sheets through the apparatus is effected. After the trailing end of a sheet has moved across the upper surfaces of tables 24, it will drop past the shoulders 28 into the position shown at the right of FIGURE 5. The actuator 22 may then be operated to turn the forward bar 19 from the position shown in FIGURE 9 to that of FIGURE 8 without contacting the trailing portion of such sheet so that it will be in position to be engaged by and locate the leading end of the next sheet.

Assuming that the sheet material extending through the apparatus is at rest during a joining operation in which the press is closed, the sheet end registering mechanism is utilized for the purpose of establishing the proper overlap between the trailing end of the preceding sheet and the leading end of the succeeding sheet in the following manner. By energizing motor 13, shaft 7 is rotated in one direction or the other to shift the registering mechanism carriage along the frame side bars 5 until at least one shoulder 28 touches the trailing end of the preceding sheet supported on bars 62, or the registering mechanism may be slightly rearwardly of this position. The next succeeding sheet S is then slid forward from the top of the stack by the operator over the upper edge of the apron 3 and across the tops of tables 24 until the leading end of this sheet contacts at least one of the depending contact flanges 27 when they are in their lowered positions of FIGURE 8.

If the scarfed ends of veneer sheets are not perfectly square with their side edges, such scarfed ends may not touch both of the shoulders 28 and both of the depending flanges 27, respectively. One side of each succeeding sheet will be precisely aligned with the corresponding side of the preceeding sheet by being pressed against the side edge guide 34. Allowance is made for any departure of the scarfed ends of a sheet from being square with the sides of the same sheet by the ability of the mounting plates 15 for bars 19 and 20 to move independently.

If the operator presses the succeeding sheet firmly forward, the pressure of its leading end on one flange 27 may be somewhat greater than the pressure of such end on the other flange. In that event, the mounting plate 15 at one end of the bars 19 and 20 will be shifted somewhat farther forwardly than the other plate 15 in opposition to the force of springs 18. By this movement the tables 24 and shoulders 28 will also be shifted correspondingly so that the trailing end of the preceding sheet will be engaged firmly by both shoulders. By this manipulation, therefore, the leading end portion of each succeeding sheet will overlap the trailing end portion of each preceding sheet by precisely the spacing between the downwardly projecting contact flanges 27 and the shoulders 28.

While the press mechanism is not shown in detail, it is illustrated generally in FIGURES 1, 2 and 3. The press frame 35 straddles the path of movement of the sheet through the apparatus. These sheets pass over a lower platen 36 and the joint may be pressed by a movable upper platen 37. Such upper platen is supported by links 38 connected to bell crank levers 39 located near opposite ends of the movable platen. These levers are interconnected by a rod 40 which coordinates their swinging movement so that the movable platen will be lowered and raised in precisely parallel relationship to the lower platen. Swinging of these bell crank levers may be effected by a fluid pressure actuator 41 connected to one of them, which may be an air operated piston-and-cylinder device.

The press mechanism thus described is mounted stationarily with respect to the frame of the apparatus. During the pressing operation, therefore, the sheet material will not be moved relative to the apparatus. On the contrary, in order to set each joint, the ends of adjacent sheets properly overlapped as described above will be placed in the press and it will be closed and remain closed until setting of the joint has been completed. Proper alignment of the sheet material placed in the press is insured by engagement of one edge of a sheet with the edge alignment roller 42. If the adhesive employed to bond the edges of the sheets together is of thermosetting character, the press platens will, of course, be heated.

In order to provide a joint with the desired overlap established by the end-registering mechanism described above, it is necessary to transport the preceding and succeeding sheets so that their overlapping ends will be moved from the end-registering mechanism to the press mechanism in undisturbed relationship lengthwise of the sheets. To accomplish this operation, shuttle transport means of clamping type are provided which will grip sheet material at opposite sides of the end-registering mechanism simultaneously and transport such material lengthwise until the overlapping end portions of such sheet material are located properly between the press platens 36 and 37. Such transport means is a shuttle carriage reciprocable along the frame side bars 5. This carriage includes a forward crossbar 43 (FIGURES 1, 2, 3 and 10) and a rearward crossbar 44 (FIGURES 5, 7, 8 and 9) which crossbars are connected for conjoint movement by longitudinal struts 45 extending parallel to and adjacent to the opposite frame side bars 5. The longitudinal struts are of a length sufficient to enable the forward crossbar to be located forward of the press frame 35, while the rearward crossbar 44 is located rearwardly of the shoulders 28 of the end-registering mechanism.

The shuttle carriage has clamping mechanism located at opposite sides, respectively, of the press to engage the sheet material at opposite sides of the end-registering mechanism. The clamping means at the forward side of the press preferably is associated with the forward carriage crossbar 43 and takes the form of a plurality of individual presser feet 46 spaced transversely of the direction of movement of the sheet material through the apparatus and engageable with the upper face of such sheet material for pressing it downward against the forward carriage crossbar. Such presser feet may be operated by individual pressure fluid actuators 47 carried by an upper crossbar 48 superposed above the lower forward carriage crossbar 43. The fluid pressure actuators conveniently may be air piston-and-cylinder devices. When such actuators are energized, the presser feet 46 will clamp against the forward crossbar 43 sheet material forward of the press mechanism. As the carriage is moved in the direction of sheet travel, therefore, it will draw such sheet material extending beyond the press through the apparatus and any sheet material at the feed side of the press which is attached to such sheet material clamped by the presser feet 46.

At the rearward or feed side of the press, additional clamping mechanism is mounted on the carriage but preferably this is of the sheet edge-clamping type. Such clamping means conveniently may be located at opposite ends of the rearward carriage crossbar 44. The edge-clamping mechanism is shown best in FIGURES 6 and 7 as including spaced plates forming supports 49 for a pivot rod 50 on which clamping arms 51 carrying jaws 52 are mounted at each side of the path of sheet travel. Such supports are shown best in FIGURE 5. These arms 51 are interconnected by a fluid pressure actuator 53 which may be of the air operated piston-and-cylinder type. The cylinder of the actuator is mounted on one of the arms and the piston is connected to the other arm. The drawings show the cylinder as mounted on the lower arm and the piston or plunger connected to the upper arm.

In FIGURE 6 the actuator 53 is shown in position in which the jaws 52 are opened. The entire actuator arm and jaw structure floats on pivot 50 so that such structure may rotate as a unit but conjoint downward swinging of the jaws can be limited at the desired position by appropriate adjustment of the stop screw 54 mounted on the support 49. The actuator should open the jaws a distance appreciably greater than the vertical distance between the ledges 25 and the tables 24 so that when open the jaws will straddle the edges of the sheets resting on such ledges and tables. When the actuator 53 is operated to close the jaws, the actuator, clamp arm and jaw assembly can swing as a unit about pivot 50 depending upon the elevation of the sheet edge engaged and if the elevation of such sheet edge changes, such structure will swing about pivot 50 to adjust itself as a unit to such change in elevation.

Since the purpose of the shuttle carriage is to move simultaneously and equally a sheet preceding the registering mechanism 1 and a sheet following such registering mechanism, it is necessary that the forward clamping feet 46 grip such preceding sheet and that the sheet edge clamping means described engage the edges of the following sheet behind the shoulders 28. Prior to gripping actuation of the clamping means, therefore, the shuttle carriage is rolled on its wheels 55 along the frame side beams 5 into the position shown in FIGURES 1 and 8. When the rearward clamps are in this position, the forward clamps 46 will still be at the forward or discharge side of the joint press as seen in FIGURE 1. The actuators 47 and 53 can then both be energized to close the clamps if the trailing end of the preceding sheet and the leading end of the following sheet are in the proper overlapping relationship illustrated in FIGURE 8.

Any suitable drive mechanism can be provided for moving the shuttle carriage forwardly and rearwardly, but satisfactory drive mechanism is shown in FIGURES 1, 2, 3 and 10. A belt or chain 58 has one of its sides connected to an element of the carriage, such as the forward carriage crossbar 43. This belt is driven by a reversible motor 59 and a connecting belt 60. The length of the belt loop will exceed the maximum travel of the shuttle carriage. Rearward movement of the carriage is interrupted by engagement of the carriage with a limit switch 61 in the circuit of motor 59, which switch is mounted on the end registering mechanism 1 as shown in FIGURES 8 and 9. This switch is positioned so that when the circuit of motor 59 is interrupted by its actuation, the shuttle carriage will be stopped with the clamp jaws 52 rearwardly of the shoulders 28 and spaced from them a predetermined distance lengthwise of the travel of the sheet material.

The clamping carriage will be returned to grip the next length of sheet after the clamps 52 have been released following a sheet feeding operation. During such carriage return movement the motor 13 can be energized to shift the registering mechanism as may be necessary to locate the next sheet ends in proper overlapping relationship, and automatic operation of such motor is limited to the period during which the clamping carriage is returning. When return movement of the carriage is initiated the fluid pressure actuators 22 are also operated to rock bar 19 and stop members 26 downward from the position of FIGURE 9 to that of FIGURE 8. If the registering mechanism should be too far forward the flanges 27 will descend onto the trailing portion of the preceding sheet which is still supported on the tables 24. Consequently the normally closed switches 57, controlling operation of motor 13 to move the registering mechanism rearwardly, cannot be opened by engagement of the fingers on stop members 26 with such switches and the registering mechanism will be moved rearward until the trailing end of the preceding sheet drops off the tables 24 past the shoulders 28 onto ledges 25.

If the registering mechanism should be too far rearward when the clamps are opened, on the other hand, the trailing end of the preceding sheet will rest on the ledges 25 ahead of shoulders 28. In such case the trailing end of the sheet will not engage the arms of normally closed switches 56 which control energization of motor 13 to drive the registering mechanism forward. Consequently the registering mechanism will be moved forward until the arm of a switch 56 engages the trailing end of the preceding sheet to open the switch and motor circuit, which terminates forward movement of the registering mechanism.

When the registering mechanism has thus been located automatically in the proper relation to the trailing end of the preceding sheet by opening of switches 56 and 57, the leading end of the following sheet is pressed into engagement with the flanges 27. Proper registration of the sheet ends in overlapping relationship can be assured by the feel of the leading end of the following sheet engaging both flanges. As has been explained previously, the registering mechanism can be skewed by pressure of the leading end of the following sheet against such flanges to establish the proper degree of end overlap even if the ends are not exactly perpendicular to the sheet sides.

When the carriage has moved rearwardly to engage the arm of switch 61 as shown in FIGURE 8 and the clamping devices 46 and 52 have been actuated to grip the preceding sheet and the following sheet, the operator may, at will, initiate forward movement of the shuttle carriage by energization of motor 59 to feed the sheet material through the apparatus. The carriage feed motor cannot be energized, however, until a pressure has been built up by the clamping means sufficient to exert a firm grip on the sheet, and the joint press is fully open. During such movement, the trailing end of the preceding sheet will be slid forward off the ledges 25 and the following sheet will be pulled across the tables 24 as indicated in FIGURE 9, but the clamping means will maintain the overlapping ends of these sheets in constant relationship to each other. During such forward movement, the sheets will be supported by bars 62, the rearward ends of which are secured to the apron 3 as shown in FIGURE 5. The forward ends of these bars are slidably supported by suitable guide means beneath the press.

A limit switch 63 (FIGURE 10) located adjacent to the press is engageable by a portion of the carriage, such as the rearward crossbar 44, for the purpose of deenergizing the motor 59. The carriage will drift following deenergization of the motor far enough so that the overlapping ends of the preceding and following sheets will be lodged accurately between the press platens 36 and 37 when the carriage stops. Another limit switch 64 may be provided in a position to be engaged by the carriage just as it stops, which may perform several functions. First it may effect actuation of presser foot 65 mounted on the press to engage the sheet material adjacent to its discharge side prior to the closing and subsequent to the opening of the press platens. Second, switch 64 may effect closing of the press, and third, it may effect release of the clamping devices 46 and 52. The clamping arms 52 will not be released, however, until a pressure has been built up by the press sufficient to hold the sheet material firmly in place. Such switch may also initiate energization of motor 59 in the reverse direction to return the carriage to its rearward position for gripping the sheet material at opposite sides of the next joint to be made.

As pressing of each joint is completed, the press actuator 41 may be energized by suitable timing mechanism to open the press but preferably the auxiliary presser foot remains in clamping engagement with the sheet material until the clamping devices 46 and 52 have been energized again to grip the material. As the shuttle carriage begins its next forward movement, the completed joint will cause all the material between such joint and the trailing end of the sheet just joined to be moved with the sheet material gripped by the clamping member 46. The sheet material ahead of the clamping devices 46 will be pushed through length-cutting mechanism which, for veneer or hardboard sheets, may be a conventional clipper 66. As sheet material projecting beyond clipper 66 contacts the trigger 67, the clipper will be actuated to sever a unit of desired length from the continuous length of sheet material. The operation of the clipper is sufficiently rapid that movement of such sheet material need be interrupted only momentarily during the clipping operation.

As shown in FIGURE 1, even though the main body of the sheet material is held stationary during a pressing operation, the unit length severed by the clipper will be carried by inclined live rolls 68 both laterally against the edge alignment board 69 and forwardly in the direction indicated by the arrow. During such movement, the sheet will be trimmed to the desired width by the edge trimming saw 70. Upon discharge from such edge trimming means, the sheets will be stacked as indicated at the right of FIGURE 1, which stack may be accumulated on an elevator.

Considering that the sheet material is stationary at the left of FIGURE 1 while a joint is being completed but the carriage is in its full rearward position ready to move the next joint to the press, the clamping devices 46 and 52 will be energized to grip the sheet material. The carriage will then travel forward as shown in FIGURES 2 and 9, to move the next joint to be pressed into the press while the upper contact flanges 27 have been retracted as shown in FIGURE 9 to allow the succeeding sheet to be moved in this fashion by the clamping jaws 52. The carriage will then progress forward through the position of FIGURE 10 to the extreme forward position of FIGURE 3 at which time the overlapping ends to be joined will have been placed in proper registry with the press platens 36 and 37 as shown in that figure. The clamping devices 46 and 52 are then released and the shuttle carriage is returned to the position of FIGURE 1 by reversal of motor 59. At that time, the operator feeds another sheet from the top of the stack S into the end-registering mechanism and initiates the next joining cycle.

I claim as my invention:

1. In a sheet end locating device, sheet-supporting means, a carriage movable relative to said sheet-supporting means, sheet end locating means carried by said carriage engageable with the end of a sheet on said sheet-supporting means by movement of said carriage relative to said sheet-supporting means, carriage drive means connected to drive said carriage relative to a sheet end to be engaged by said sheet end locating means, and control means connected to said carriage drive means and mounted on said carriage in position for engagement by the end of a sheet on said sheet-supporting means for deenergizing said carriage drive means by engagement of such sheet end with said control means when said sheet end is disposed in a predetermined relationship to said sheet end locating means.

2. In a sheet end locating device, sheet-supporting means, a carriage movable relative to said sheet-supporting means and having a ledge carried thereby abuttable with one end of a first sheet on said sheet-supporting means by movement of said carriage relative to said sheet-supporting means, a flange carried by said carriage located above and spaced horizontally from said ledge in opposed predetermined relationship thereto, abuttable by one end of a second sheet by movement of said second sheet relative to said sheet-supporting means, for disposition of a portion of said second sheet adjacent to its flange-abutting end in predetermined overlapping relationship to a portion of said first sheet adjacent to its end abutted with said ledge, clamping means engageable to grip said first and second sheets for holding them with such end portions in such overlapping relationship and drive means operatively connected to said clamping means to effect movement thereof relative to said carriage for shifting conjointly the sheets clamped thereby fixed in relation to each other out of engagement with said ledge and said flange respectively.

3. In a sheet end locating device, a ledge abuttable with one end of a first sheet to locate said ledge and such sheet end in predetermined relationship, a flange located above and spaced horizontally from said ledge in opposed predetermined relationship thereto, abuttable by one end of a second sheet for disposition of a portion of such second sheet adjacent to its flange-abutting end in predetermined overlapping relationship to an end portion of said first sheet adjacent to its end abutted with said ledge, clamping means engageable to grip said first and second sheets for holding them with such end portions in such overlapping relationship, moving means interengageable between said ledge and said clamping means and operable to effect relative movement of the clamped sheets and said ledge, and means operable to effect relative separating movement of said ledge and said flange to enable said moving means to effect such relative movement of said clamping means and said ledge.

4. In a sheet end locating device, sheet-supporting means, a carriage movable oppositely toward and away from said sheet-supporting means and having a ledge abuttable with one end of a first sheet on said sheet-supporting means by movement of said carriage relative to said sheet-supporting means to locate said ledge and such sheet end in predetermined relationship, a flange mounted on said carriage above said ledge and spaced horizontally from said ledge in opposed predetermined relationship thereto, abuttable by one end of a second sheet having its end portion adjacent thereto located in predetermined overlapping relationship to a portion of said first sheet adjacent to its end abutted with said ledge, clamping means engageable to grip said first and second sheets for holding them with such end portions in such overlapping relationship, and transport means connected to said clamping means and operable to move away from said carriage said clamping means and the sheets with their end portions fixed in such overlapping relationship by being gripped by said clamping means.

5. A scarfed sheet end locating device comprising registering means engageable with adjacent complementally scarfed end portions of adjacent sheets to locate such scarfed sheet end portions in predetermined registering overlapping relationship, clamping means engageable with such sheets while their end portions are in engagement with said registering means for holding them with their registering overlapping scarfed end portions in such registering overlapping relationship, transport means operable to effect relative movement of said clamping means and said registering means prior to clamping engagement of said clamping means with a sheet, to locate said clamping means in a desired relationship to the scarfed sheet end portions in engagement with said registering means, and control means operable automatically by relative movement of said transport means and said registering means to terminate such relative movement when said clamping means are in the predetermined relationship to said registering means for locating said clamping means in such desired relationship to the overlapping scarfed sheet end portions in engagement with said registering means.

6. A scarfed sheet end joining machine comprising stationary sheet joint-pressing means, registering means independent of and remote from said sheet joint-pressing means, engageable with adjacent complementally scarfed end portions of adjacent sheets to locate such scarfed sheet end portions relatively in predetermined registering overlapping relationship, clamping means engageable with such sheets while their end portions are in engagement with said registering means for holding them with their registering overlapping scarfed end portions in such registering overlapping relationship, and transport means connected to said clamping means and operable to move said clamping means and the sheets clamped thereby transversely of the sheet ends relative to said registering means and said stationary sheet joint-pressing means to shift such overlapping scarfed sheet end portions from said registering means to said sheet joint-pressing means and place the sheet end portions therein to be pressed thereby.

7. A scarfed sheet end joining machine, first locating means having a surface extending transversely of a preceding sheet and substantially parallel to the scarfed end edge thereof, engageable by such end edge, second locating means having a surface disposed substantially parallel to such surface of said first locating means and spaced a predetermined distance therefrom, engageable by the scarfed end edge of a following sheet for disposition of complementally scarfed end portions of adjacent ends of such sheets in predetermined registering overlapping relationship, clamping means clampingly engageable with such sheets while their overlapping scarfed end portions are in such registering overlapping relationship, sheet joint-pressing means spaced in a direction parallel to such sheets and transversely of their scarfed end edges from both of said locating means, and transport means operable to effect relative movement of said clamping means, while clamping such sheets, and said sheet joint-pressing means to place such overlapping scarfed sheet end portions in said sheet joint-pressing means.

8. In a sheet end locating device, sheet-supporting means, a carriage movable relative to said sheet-supporting means, first locating means carried by said carriage and shiftable by movement of said carriage into engagement with an end edge of a sheet on said sheet-supporting means, and second locating means carried by said carriage in opposed predetermined relationship to said first locating means and engageable by the end edge of a second sheet by movement of such second sheet relative to said carriage so that portions of such sheets adjacent to such engaged end edges overlap in predetermined registering relationship.

9. In a sheet end locating device, a movable ledge abuttable with the trailing end of a first sheet by movement of said ledge relative to such trailing end to locate said ledge and such sheet trailing end in predetermined relationship, a flange located above said ledge in opposed predetermined relationship thereto, abuttable by the leading end of a second sheet by movement of such second sheet toward said flange, for disposition of the leading portion of such second sheet in position overlapping to a predetermined degree the trailing portion of such first sheet, and means mounting said ledge and said flange for relative movement to disengage said flange and such second sheet for enabling such sheets to move conjointly relative to said ledge and said flange in the same direction such second sheet moved in engaging said flange.

10. A sheet end joining machine comprising sheet-supporting means, a carriage, reversible drive means operatively connected to said carriage to move it oppositely toward and away from said sheet-supporting means, said carriage having thereon a ledge abuttable with one end of a first sheet on said sheet-supporting means by movement of said carriage relative to said sheet-supporting means, a flange carried by said carriage and located above and spaced horizontally from said ledge in opposed predetermined relationship thereto, abuttable by one end of a second sheet overlapping said first sheet by movement of such second sheet relative to said sheet-supporting means for disposition of a portion of such second sheet adjacent to its flange-abutting end in predetermined overlapping relationship to a portion of such first sheet adjacent to its end engaged with said ledge, sheet joint-pressing means spaced from said carriage, clamping means engageable to grip such first and second sheets for holding them with such end portions in such overlapping relationship, and transport means connected to said clamping means and operable to move said clamping means and the sheets gripped thereby away from said carriage to said joint-pressing means to be pressed thereby.

11. A sheet end joining machine comprising sheet joint pressing means engageable with overlapping end portions of adjacent sheets for pressing such overlapping sheet and portions together during joining, first clamping means at one side of said sheet joint pressing means engageable with at least one of such sheets while such sheets are disposed with their end portions in such overlapping relationship prior to joining and with said end portions to said one side of said sheet joint pressing means but one of said adjacent sheets having a portion thereof in said sheet joint pressing means, second clamping means at the side of said sheet joint pressing means remote from said first clamping means and operable to clamp a sheet at such side of the sheet joint pressing means remote from said first clamping means and joined to the one of the said adjacent sheets having a portion thereof in said sheet joint pressing means, and transport means connecting said first and second clamping means in predetermined fixed relationship and movable to effect conjoint movement of said two clamping means in sheet-clamping condition for moving the overlapping sheet end portions and said first clamping means toward said joint pressing means while moving said second clamping means away from the sheet joint pressing means.

12. In a sheet end locating device, sheet-supporting means for supporting a first sheet, a carriage movable in opposite directions toward and away from said sheet-supporting means, and locating means engageable by an end of a second sheet and including two sheet end engaging members spaced along the end of said first sheet on said sheet-supporting means, mounting means supporting said sheet end engaging members, and parallel linkage means supporting said mounting means on said carriage for movement of said sheet end engaging members relative to said carriage through unequal distances, if necessary to establish engagement of both of said sheet end engaging members with the end of said first sheet on said sheet-supporting means, for locating said end of said second sheet in predetermined relationship to said end of said first sheet.

13. In a sheet end locating device, a swingably floating clamp for clamping opposite faces of the edge portion of sheet means and including a pair of relatively movable jaws for receiving the sheet means therebetween, pivot means supporting said jaws and connecting them for relative swinging about the axis of said pivot means, jaw-actuating means interengaged between and supported solely by said jaws and operable to effect relative closing movement thereof, and clamp-supporting means supportingly engaging said pivot means independently of said jaws and said jaw-actuating means and supporting said jaws and said jaw-actuating means solely by said pivot means.

References Cited in the file of this patent
UNITED STATES PATENTS

| | | |
|---|---|---|
| 331,519 | McDonald | Dec. 1, 1885 |
| 1,325,185 | Bailey et al. | Dec. 16, 1919 |
| 1,490,594 | De Lateur | Apr. 15, 1924 |
| 1,685,613 | Onsrud | Sept. 25, 1928 |
| 1,771,105 | Williams | July 22, 1930 |
| 2,129,276 | Herr | Sept. 6, 1938 |
| 2,184,862 | Koss | Dec. 26, 1939 |
| 2,532,419 | Payzant | Dec. 5, 1950 |